Nov. 1, 1938.  R. T. RICHES ET AL  2,135,412
DEVICE FOR ADVERTISING AND LIKE PURPOSES
Filed July 7, 1937  3 Sheets-Sheet 1
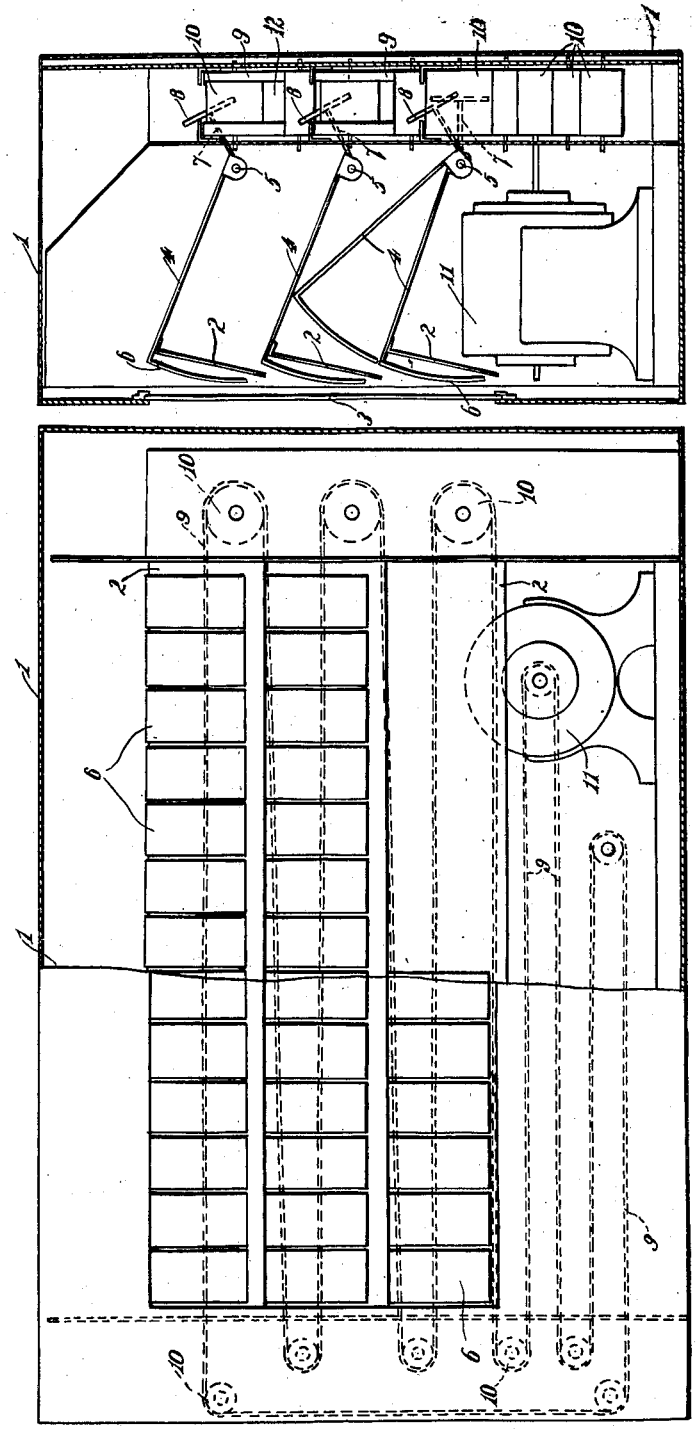
INVENTORS
RODERICK T. RICHES
GEOFFREY H. RICHES
By Norris & Bateman
ATTORNEYS Nov. 1, 1938.  R. T. RICHES ET AL  2,135,412
DEVICE FOR ADVERTISING AND LIKE PURPOSES
Filed July 7, 1937  3 Sheets-Sheet 2
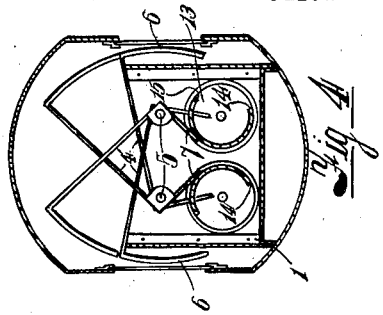
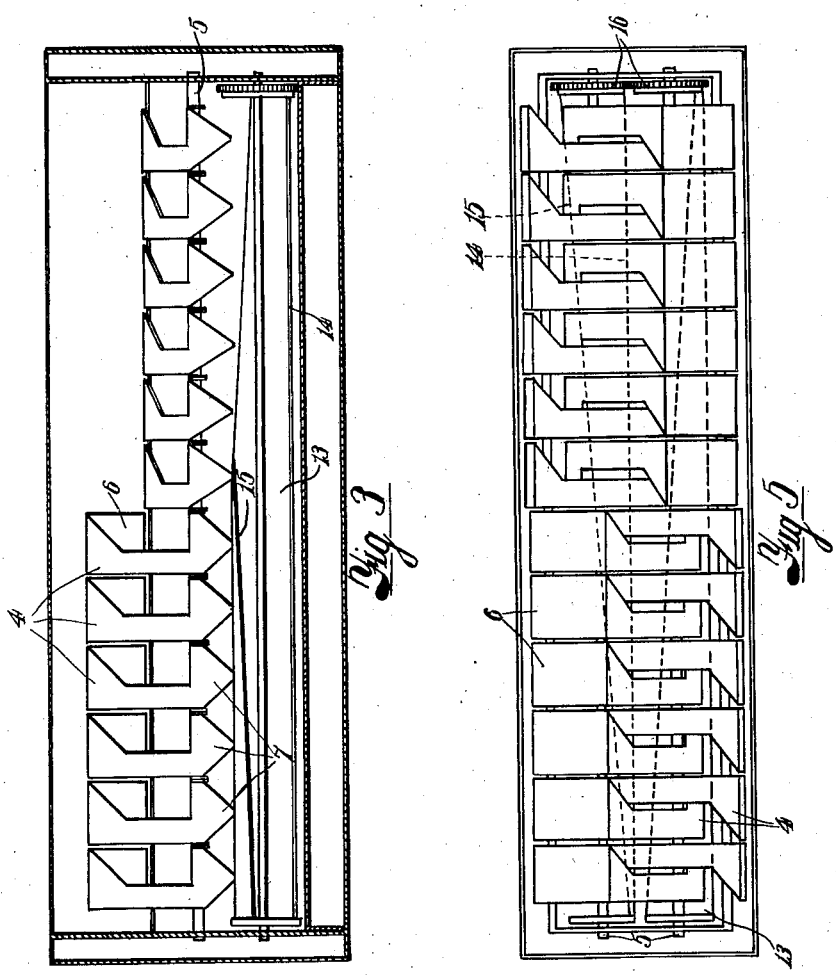
INVENTORS
RODERICK T. RICHES
GEOFFREY H. RICHES
By Norris & Bateman
ATTORNEYS Nov. 1, 1938.   R. T. RICHES ET AL   2,135,412
DEVICE FOR ADVERTISING AND LIKE PURPOSES
Filed July 7, 1937   3 Sheets-Sheet 3
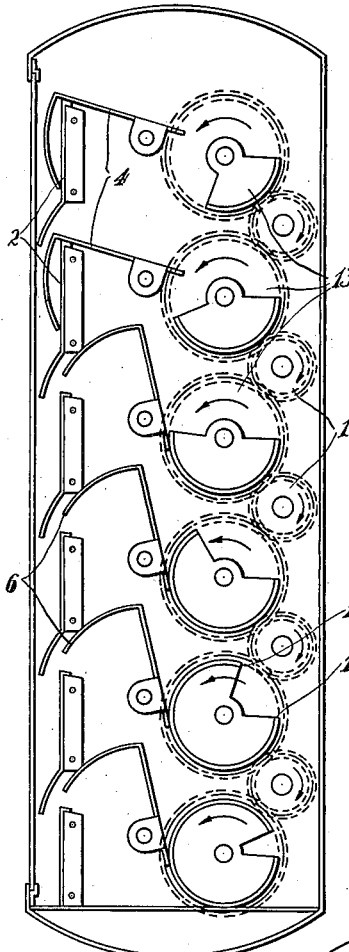
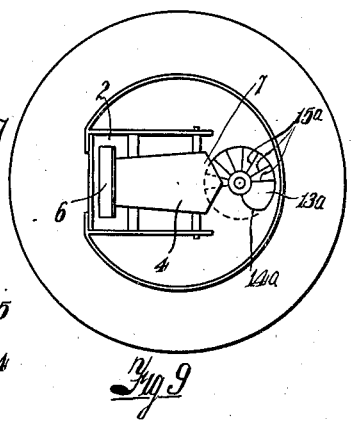
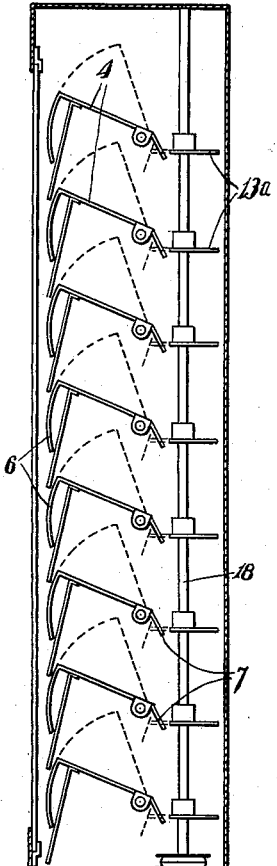
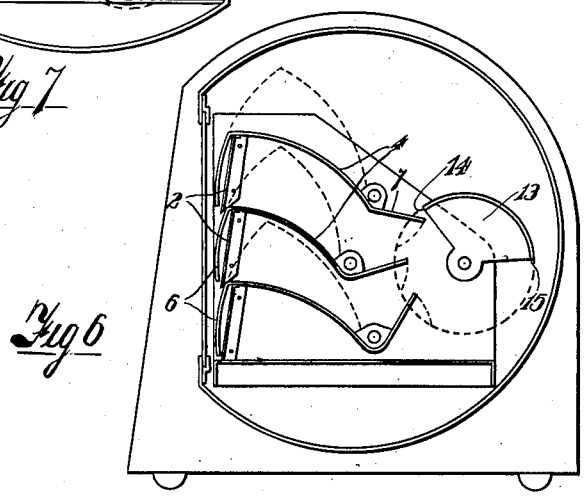
INVENTORS
RODERICK T. RICHES
GEOFFREY H. RICHES
By Norris & Bateman
ATTORNEYS Patented Nov. 1, 1938

2,135,412

UNITED STATES PATENT OFFICE

2,135,412

DEVICE FOR ADVERTISING AND LIKE PURPOSES

Roderick Thomas Riches and Geoffrey Henry Riches, Bromley, England

Application July 7, 1937, Serial No. 152,432
In Great Britain July 8, 1936

9 Claims. (Cl. 40—62)

This invention relates to apparatus for advertising and for like purposes, and has for its object to provide an improved construction and arrangement capable of use for spelling out advertisements or notices letter by letter or for the display of pictures or designs, and which is of such a character that the matter displayed can be varied from time to time in a simple manner.

According to one aspect of the invention the improved apparatus comprises a number of letters or devices which are independently mounted and arranged to be projected in succession into a visible position by automatically operated means.

According to another aspect of the invention the improved apparatus comprises a frame-work or casing and a number of letters or devices which are independently mounted and are arranged to be oscillated in succession into a visible position through an opening or openings by automatically operated means.

In carrying the invention into effect according to the preferred form the improved apparatus comprises a casing, a framework having therein one or more louvred openings, a number of independently mounted elements capable of bearing lettering and automatically operated means for moving said elements successively through the said openings into visible positions and for removing all of said elements simultaneously to an invisible position after the complete statement has been exposed.

Reference will now be made to the accompanying drawings which illustrate by way of example, several forms of advertising apparatus constructed according to the invention and in which:—

Figure 1 is a sectional elevation of a form of apparatus in which the levers bearing the lettering are actuated by an endless belt, Figure 2 is a sectional end view of Fig. 1, Figure 3 is a sectional elevation of another form of the invention in which the levers bearing the lettering are actuated by rotary cams, Figure 4 is a sectional end view of Fig. 3, Figure 5 is a plan view of Fig. 3, Figure 6 is a sectional end view of a further modification in which a plurality of sets of lettering are actuated by a common rotary cam, Figure 7 is a sectional end view of another form of the invention in which several horizontal series of lettering are mounted in a common housing and are actuated each series by a separate rotary cam, Figure 8 is a sectional end view of a further form of the apparatus in which the letters forming the sign are arranged vertically and Figure 9 is a plan view of Fig. 8.

Referring first to the form of construction shown in Figs. 1 and 2, the apparatus comprises a casing 1 having a front glass panel 3, the front portion of the casing containing a number of horizontal louvres 2, the adjacent edges of which are so spaced that to the observer only a very narrow opening exists between them.

Behind the louvre framework are a number of levers or arms 4 pivotally mounted on transverse spindles 5 and each formed with or constructed to carry a plate 6 on which a letter or device is marked. The spindles 5 are so disposed that the plate 6 can be projected to a visible position in front of one of the louvres and retracted to an invisible position behind the next upper louvre. For the purpose of rocking the arms 4, each is provided with a tail or extension 7, which carries a roller 8 adapted to be engaged by a travelling belt 9 guided on drums or pulleys 10 and driven by an electric motor 11. The belt is arranged to bear from above upon all the rollers 8 projecting upwardly from the tail pieces 7 and is formed over part of its length with a central slot 12 so that as the belt moves its slotted portion comes above the first roller 8 and thus pressure on the roller is removed allowing the arm or lever 4 to fall by gravity into the position in which its outer end is visible. The continued movement of the belt will thus cause all the arms to fall in succession, thus gradually spelling out the advertisement or notice which may extend over a number of successive lines.

The slot in the belt is of such a length that when the whole advertisement or the like has been exposed, it remains completely exposed for a sufficient length of time for it to be properly read, after which the solid portion of the belt begins to act on the first levers of the series until it gradually withdraws all the levers to the position in which the front of the sign presents a blank surface. As soon as the last letter of the sign disappears the slot in the belt again becomes operative and begins to disclose once more the first letters of the series.

It will be understood that the letters forming the sign may be arranged vertically instead of horizontally and, if desired, two sets of arms may be employed pivotally mounted at opposite sides of the casing so as to provide a sign visible from two sides, the arms extending in one direction alternating with those extending in the other, and both sets of arms being actuated by a common belt.

Further, instead of employing a belt, a pair of sprocket chains may be used with cross bars or mesh work between them at the portion which would otherwise be occupied by the solid portion of the belt.

In the form of the invention illustrated in Figs. 3-5 the sign is arranged to be visible on two sides and the arms are adapted to be actuated in sequence to spell out the lettering or the like and simultaneously to remove the displayed matter from the visible position.

Two horizontal series of letters are provided, each series of arms 4 being mounted on a separate shaft 5 and extending across the casing 1, the arms of one series alternating with the arms of the other.

The tail pieces 7 of each series of arms extend into the path of a rotary cam 13 of partially cylindrical form, the leading edge 14 of which extends parallel to the axis of rotation whilst its trailing edge 15 is inclined to said axis. Upon rotation, the leading edge engages the series of tail pieces 7 and lifts them all simultaneously, moving the plates 6 into an invisible position, the arms 4 remaining in this position until the trailing edge 15 passes the tail pieces 7 which are thus released in succession allowing the arms to fall by gravity into the position in which the letters are visible. When all the arms have been released the leading edge of the cam again comes into operation and the cycle of operations is repeated.

The cams are positively driven by any suitable form of motor and are geared together as shown at 16 (Fig. 5) so that they work either in unison or in alternation.

In Fig. 6 there is illustrated a further modification in which the letter bearing arms are arranged in several horizontal series all of which are actuated by a common cam 13 mounted at the rear of the arms 4 and constructed in a similar manner to those in the form previously described. In operation, the leading edge 14 of the cam first lifts simultaneously the arms of the uppermost series, then the arms of each of the next lower series in succession. After all the arms have been lifted the inclined trailing edge 15 of the cam moves past the tail pieces 7 of the uppermost series of arms, releasing the arms of this series successively and allowing them to fall so that the letter bearing plates 6 gradually spell out the words or message. When the spelling of the top line is complete the cam performs the same operation on the next series of arms and so on until all the entire lettering is exposed.

A further variation of the above arrangement is shown in Fig. 7 in which the letter bearing arms are arranged in a number of horizontal series, each series being actuated by a separate cam 13. The cams are so arranged that their leading edges 14 all come into operation simultaneously whereby the lettering of the entire sign appears to vanish suddenly, but the trailing edges 15 of the cams are spaced from the leading edges at progressively increasing distances from the uppermost to the lowermost cam, the arrangement being such that each line of lettering is exposed in succession, and all lines remain visible until the last letter has been exposed. The cams are geared together with the aid of intermediate gear wheels 17 and are driven by an electric or other motor.

In the form of construction shown in Figs. 8 and 9, the letters of the sign are arranged vertically, each letter-bearing arm 4 being actuated by a separate cam 13a carried by a common vertical spindle 18 driven by a motor 11 through gearing 19. As will be seen from Fig. 9 the cams are so mounted that their leading edges 14a coincide whereby in operation all letters are moved to the invisible position simultaneously, whilst the trailing edges 15a are spaced from the leading edges at progressively increasing distances from the uppermost to the lowermost cam so that the arms 4 are released successively to spell out the word or words of the sign. This form of the invention is also applicable to signs adapted to be viewed from several sides, two or more sets of letters being provided actuated by a common centrally disposed set of cams.

The invention can also be applied to circular signs in which lettering or wording disposed in opposed groups is adapted to be spelt out gradually and removed suddenly. In such an arrangement the pivoted levers for the upper set of wording are arranged in a curved series and are adapted to fall by gravity into their exposed positions, being raised by means of a mutilated disc which engages rollers or the like mounted on their tail pieces. This disc is mounted on a power driven shaft geared to a second shaft which carries another mutilated disc adapted to engage rollers on the tail pieces of the second set of levers also arranged in a curved series and disposed so that the plates at their upper ends move upwards into visible position. These lower levers have weighted tail pieces which move them by gravity into the position of visibility whilst a cam surface formed on the disc engages rollers on the tail pieces to move these discs to inoperative position. By gearing two shafts together in the manner described the two discs rotate in opposite directions. For the purpose of lifting all the arms simultaneously by movement applied to one of them each is provided with a pin or lug projecting beneath the next adjacent lever. This arrangement also lends itself readily to the construction of signs which can be viewed from both sides, the pivoted levers and the operating discs being duplicated for such purpose.

The plates 6 which carry the lettering or devices may be formed integral with the forward ends of the levers 4 or the levers may be formed in any suitable manner for the attachment of such plates to allow for interchangeability of lettering. Alternatively, instead of carrying plates fixed to the ends, the levers may carry prismatic elements with three or more faces and different matter marked on each face. This arrangement enables several different advertisements or notices to be displayed by one apparatus as each time the levers are raised the prismatic members at their ends may be given a partial rotation automatically so as to bring a fresh face into a position of potential visibility. It will be understood that the levers are counterbalanced so as to ensure that when actuated they fall directly into their operative or inoperative positions without any oscillation.

The improved sign above described lends itself to day or night use, as at night time the framework of the apparatus can be provided with edge illumination, or the louvres and the plates bearing the letters or the like may be made of translucent material, so that they can be illuminated from behind.

The matter which is arranged on the ends of the pivoted levers may co-operate with other lettering or designs marked on the outer surfaces of the louvres to complete the advertisement or the like as seen by the spectator.

It may also be desirable in some instances to employ cushions of rubber, felt or the like to receive the levers on their downward movements and these cushions may be disposed along the upper edges of the louvres.

Where an advertisement or notice occupies a number of lines but all available spaces in those lines are not used, means may be provided to hold the unused levers in an inoperative position. The levers may also be adjustable lengthwise on a spindle so that any particular matter to be displayed can be arranged in a position central of the apparatus. Alternatively where a sign utilizes fewer letters than can be provided by the apparatus shutters may be arranged to cover the levers which are not actually used.

We claim:—

1. An apparatus for spelling advertisements and the like letter by letter comprising a casing having a vertical wall provided with at least one opening, a number of independently pivoted arms bearing lettering and capable only of an oscillatory movement, said arms having extensions thereon, and automatically operated means engaging the extensions of said pivoted arms and operative to release them successively and thereby allow them to fall by gravity through said opening into visible positions and to rock said arms and thereby lift them back through said opening to an invisible position after the complete statement has been exposed.

2. An apparatus for spelling advertisements and the like letter by letter comprising a casing having a vertical wall provided with at least one louvred opening, a number of independently mounted pivoted arms capable only of an oscillatory movement and bearing plates for lettering at their ends, and means engageable with the ends of said arms remote from said plates and operable to allow said arms and plates to fall successively through said opening into visible positions and to lift all of said arms and plates simultaneously back through said opening to an invisible position after a complete exposure has been made.

3. An apparatus for spelling advertisements and the like letter by letter comprising a casing having a wall provided with at least one louvred opening, a number of independently pivoted arms carrying letters and capable only of an oscillatory movement, said arms having extensions thereon, and a rotary cam of partially cylindrical form, the leading edge of which extends parallel to its axis and the trailing edge of which is inclined to said axis, said extensions on the letter carrying arms extending into the path of the cam whereby engagement of said extensions by the leading edge of the cam simultaneously rocks the series of arms to move the letters thereon to an invisible position relatively to said opening and passage of the trailing edge of the cam past said extensions releases the arms successively, allowing them to fall to the position in which the letters are visible.

4. An apparatus for spelling advertisements and the like letter by letter comprising a casing having a louvred opening in each side thereof, series of independently pivoted arms bearing lettering arranged in duplicate and capable of oscillating movement, to provide a sign visible from two sides of the casing, the arms of each series extending in opposite directions across the casing with the arms of one series alternating with the arms of the other, and common operating means for actuating both series of arms.

5. An apparatus for spelling advertisements and the like letter by letter comprising a casing having at least one louvred opening therein, a number of independently mounted elements bearing lettering, said letter bearing elements being arranged in a number of horizontal lines, and rotary cam means for said letter bearing elements for actuating each line of said elements in succession and maintaining all lines of said elements in visible positions relatively to said opening until the last letter has been exposed and for thereafter moving the lines of letters to invisible position.

6. An apparatus for spelling advertisements and the like letter by letter comprising a casing having at least one louvred opening therein, a number of horizontal lines of independently pivoted arms carrying letters movable through said opening into visible position, and a separate rotary cam for each line of letter carrying arms, said cams being operative to actuate each line of letter carrying elements in succession to render the letters thereon visible relatively to said opening and to remain visible until the last line has been exposed and to thereafter move the whole series of letters simultaneously to the invisible position.

7. An advertising apparatus for spelling advertisements and the like letter by letter comprising a casing provided with at least one opening, a number of vertically arranged letter carrying arms independently pivoted in the casing and provided with extensions, a number of cams into the path of each of which one of said extensions extends, and a common rotary spindle on which said cams are mounted, each of said cams being provided with a leading and a trailing edge and said cams being so constructed and mounted that all the leading edges thereof come into operation simultaneously to rock the letter carrying arms to the invisible position relatively to said opening and the trailing edges of said cams to release said arms successively to spell out the advertisement.

8. An apparatus for spelling advertisements and the like letter by letter comprising a casing having a front portion provided with an opening and a number of horizontal louvres arranged in said opening to provide only a narrow opening between their adjacent edges, and a number of independently pivoted elements carrying letters mounted to be projected to a visible position in front of one of the louvres and retracted to an invisible position behind the next upper louvre.

9. An advertising apparatus for spelling advertisements and the like letter by letter comprising a casing having an opening therein and a number of horizontal louvres arranged in said opening to provide only a narrow opening between their adjacent edges, a number of independently pivoted letter carrying arms mounted to be projected downwardly to a visible position in front of one of the louvres and retracted upwardly to an invisible position behind the next upper louvre, and cushions of yieldable material arranged to receive the letter carrying arms on their downward movements.

RODERICK THOMAS RICHES.
GEOFFREY HENRY RICHES.